United States Patent
Pitzler

[11] 3,811,205
[45] May 21, 1974

[54] SENSORIAL COUNTING BOARD

[76] Inventor: Mary Ann Pitzler, 114 157th Ave., N.E., Bellevue, Wash. 98008

[22] Filed: Jan. 22, 1973

[21] Appl. No.: 325,960

[52] U.S. Cl. ................................................ 35/32
[51] Int. Cl. ........................................ G09b 19/02
[58] Field of Search .......... 35/31 R, 31 F, 31 G, 32, 35/33, 73

[56] References Cited
UNITED STATES PATENTS

| 2,063,287 | 12/1936 | Aikins | 35/32 |
| 3,571,951 | 3/1971 | Siegel et al | 35/35 R |
| 3,077,677 | 2/1963 | Malkin et al | 35/31 D X |
| 2,457,332 | 12/1948 | Wade et al | 35/33 |

FOREIGN PATENTS OR APPLICATIONS

| 347,416 | 1/1922 | Germany | 35/73 |
| 413,406 | 5/1925 | Germany | 35/33 |

Primary Examiner—Wm. H. Grieb
Attorney, Agent, or Firm—J. C. Baisch

[57] ABSTRACT

A sensorial counting board or educational toy having an elongated board having vertically arranged, longitudinally spaced, areas of various colors on which are respective numbers from 1 – 10. These numbers are raised.

Depending from the board and below each number is a cord with beads slidably disposed thereon and prevented from removal by respective knots. The beads are variously colored and are all of the same size. The size of the hole through the beads are such that the beads will slide on the cords but the fit is snug enough so that the beads will be held on the cords to wherever they are moved.

3 Claims, 4 Drawing Figures

PATENTED MAY 21 1974 3,811,205

SENSORIAL COUNTING BOARD

BACKGROUND OF THE INVENTION

1. Field of the Invention

The invention relates generally to an educational toy so that children can learn numbers by active movement and feeling.

2. Description of the Prior Art

There are various prior art devices for teaching children numbers, but, they do not provide an arrangement whereby a child may not only see the numbers, but, also impress the numbers by the sense of touch and movement.

SUMMARY OF THE INVENTION

The present invention has an elongated member or board with variously colored areas spaced apart longitudinally on the board. Numbers from 1 – 10 are disposed on the colored areas and these numbers are attached to the board and depending from the respective colored areas and beneath the respective numbers are cords. Various colored beads of substantially the same size are slidably disposed on the cords and are prevented from coming off the cords by knots. Further, the beads fit snugly on the cords so that they will remain on the cords at whatever position they are moved to. The numbers on the board indicate the number of beads on the respective cords. Thus, a child can learn his or her numbers by the sense of touch and active movements.

OBJECTS AND ADVANTAGES OF THE INVENTION

It is an object of the invention to provide an educational toy or sensorial counting board that is highly effective in teaching children numbers.

It is another object of the invention to provide a device of this character whereby children may not only see the numbers, but, may readily sense their shape by running their fingers over the textured raised numbers.

It is still another object of the invention to provide a device of this character whereby a child may also count beads in accordance with the bead number being learned.

It is a further object of the invention to provide beads slidable on a cord or the like, the number of beads on the respective cords being the number being learned.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only.

DESCRIPTION OF THE PREFERRED EMBODIMENTS

Figure 1:
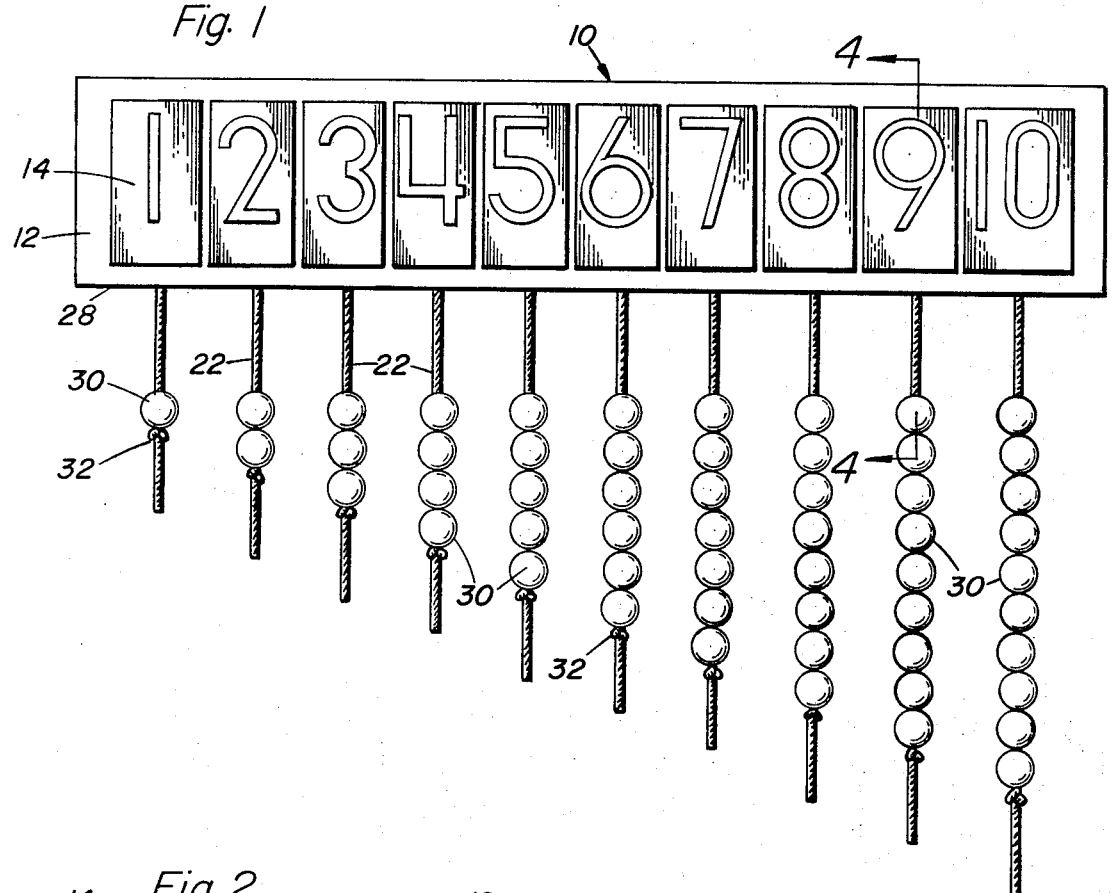
FIG. 1 is a front elevational view of apparatus embodying the present invention.
Figure 2:
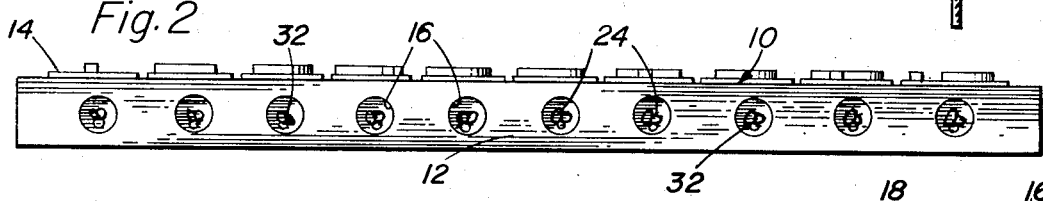
FIG. 2 is a top plane view thereof.
Figure 3:
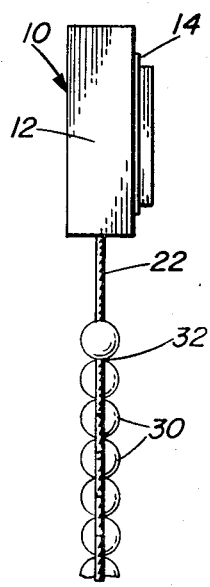
FIG. 3 is an end view.
Figure 4:
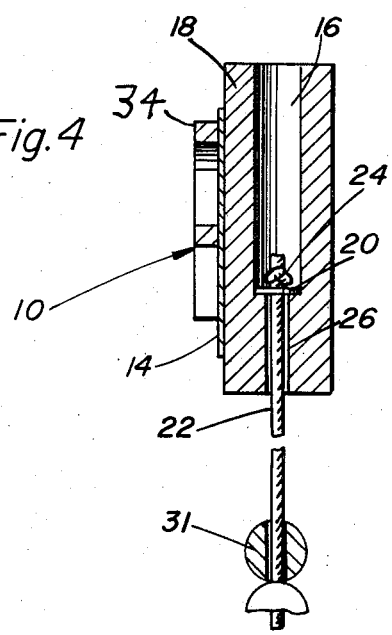
FIG. 4 is a sectional view taken on line 4—4 of FIG. 1.

Referring more particularly to the drawings, there is shown an elongated number bearing member indicated generally at 10. Member 10 may be made of any suitable material such as wood, plywood, plastic or the like. The number bearing member comprises a base 12. There are 10 colored areas which are shown as being vertical and are spaced apart longitudinally relative to the base 12. These colored areas are shown as rectangular in shape and comprise sheets of colored material 14 which are attached to the base 12 by any suitable adhesive. Various materials may be used such as cardboard, plastic or the like. The sheets 14 are variously colored and while any suitable arrangement of the colors may be provided, these sheets are shown as being red, blue, yellow, orange and green for the numbers 1–5 respectively, with the same color arrangement for the numbers 6–10 respectively. Appended from the colored sheets 14 are the raised textured numbers one through ten 34.

There are cylindrical recesses 16 extending part way downwardly from the top edge 18 of the base 12, there being such a recess for each number on the face of the base 12 and centered relative to said numbers. A washer 20 is disposed in the bottom of each recess and there is a flexible cord 22 for each number. Each cord 22 extends through the washer 20 and has a knot 24 which supports the cord. From the recess 16, there is a bore 26 which extends downwardly through the remaining portion of the base and through which the cord extends, a substantial portion of each cord depending from the base and below the lower edge 28 thereof.

On the cords 22 are beads 30 which have bores 31 therethrough for reception of the cords. The top bead of each cord is equidistant from base 12. The bores of the beads are of such size that the beads will readily slide on the cords but the beads fit snugly on the cords so that the beads will remain at any position to which they are moved by the child. This eliminates beads that have been moved upwardly on the cords so raised beads will not slide down on the cords by gravity and a child can slide a single bead at a time as he or she counts them. Knots 32 retain the beads on the cords and prevent same from slipping therefrom. The numbers on the base indicate the number of beads on the respective cords. With this arrangement, a child can learn the numbers by active movement and feeling. For example when a child begins to count, he is told to say "One"; then with his index finger, he feels and traces the number in the direction he will later write the number. Using the number "one" as the example, the child runs his finger along the number from the top to the bottom. Other numbers are raised in the same manner.

The child is then directed to take the cord, or lace, in one hand and with the other hand, move the bead up to the number. In the example, the number would be "One," and at the same time have the child say "One." The next number is then taken and the beads moved separately up to the number and the same is done with the succeeding numbers. This will help the child learn the concept of "One," "Two," "Three," etc.

While the device has been shown in a vertical position, alternatively, it may be layed flat on a table or the floor.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore described being merely by way of example and I do not wish to be restricted to the specific form shown or uses mentioned except as defined in the accompanying claims.

I claim:

1. A sensorial counting device, comprising:

an elongated base with numbers on the face thereof;

cords attached to the base and depending therefrom in alignment with the respective numbers;

beads on the cords;

the beads having bores therethrough for reception of the cords, the diameter of the bores relative to cross section of the cords is such that the beads are readily slidable on the cords but will remain by friction at any position on the cords to which they are slidably moved, the top beads of the cords being equadistant from the base;

the number of beads on the respective cords being indicated by the respective numbers;

said numbers being raised.

2. The invention defined by claim 1, wherein the base has a colored background for each number.

3. The invention defined by claim 2, wherein the colors are varied.

* * * * *